United States Patent [19]
Van Horn

[11] 3,871,784
[45] Mar. 18, 1975

[54] BRACKET SUPPORT STRUCTURE

[76] Inventor: James Van Horn, 185 Peter Rd., Libertyville, Ill. 60048

[22] Filed: Mar. 21, 1973

[21] Appl. No.: 343,520

[52] U.S. Cl.................. 403/236, 248/245, 211/148, 211/177, 5/295
[51] Int. Cl............................................ F16l 11/12
[58] Field of Search.................. 211/177, 182, 148; 403/233–236; 248/245; 108/111; 5/294, 295, 300, 303, 304

[56] References Cited
UNITED STATES PATENTS

| | | | |
|---|---|---|---|
| 2,123,695 | 7/1938 | Elmer | 211/177 X |
| 2,930,638 | 3/1960 | Morissey | 211/182 |
| 3,021,013 | 2/1962 | Shivek | 248/245 X |
| 3,523,613 | 8/1970 | Konstant | 211/182 X |

Primary Examiner—Geo. V. Larkin
Attorney, Agent, or Firm—Hill, Gross, Simpson, Van Santen, Steadman, Chiara & Simpson

[57] ABSTRACT

A connecting structure for attaching together frame members in perpendicular relation to one another.

The structure including a U-shaped bracket which has openings adjacent the ends of the legs and a set screw through the bight. The bracket is received around a rectangular frame member and a pin extending through a second rectangular frame member is engaged in the openings of the bracket. Thereafter tightening the set screw locks the second rectangular frame member to the first rectangular frame member in perpendicular relation.

2 Claims, 4 Drawing Figures

PATENTED MAR 18 1975
3,871,784
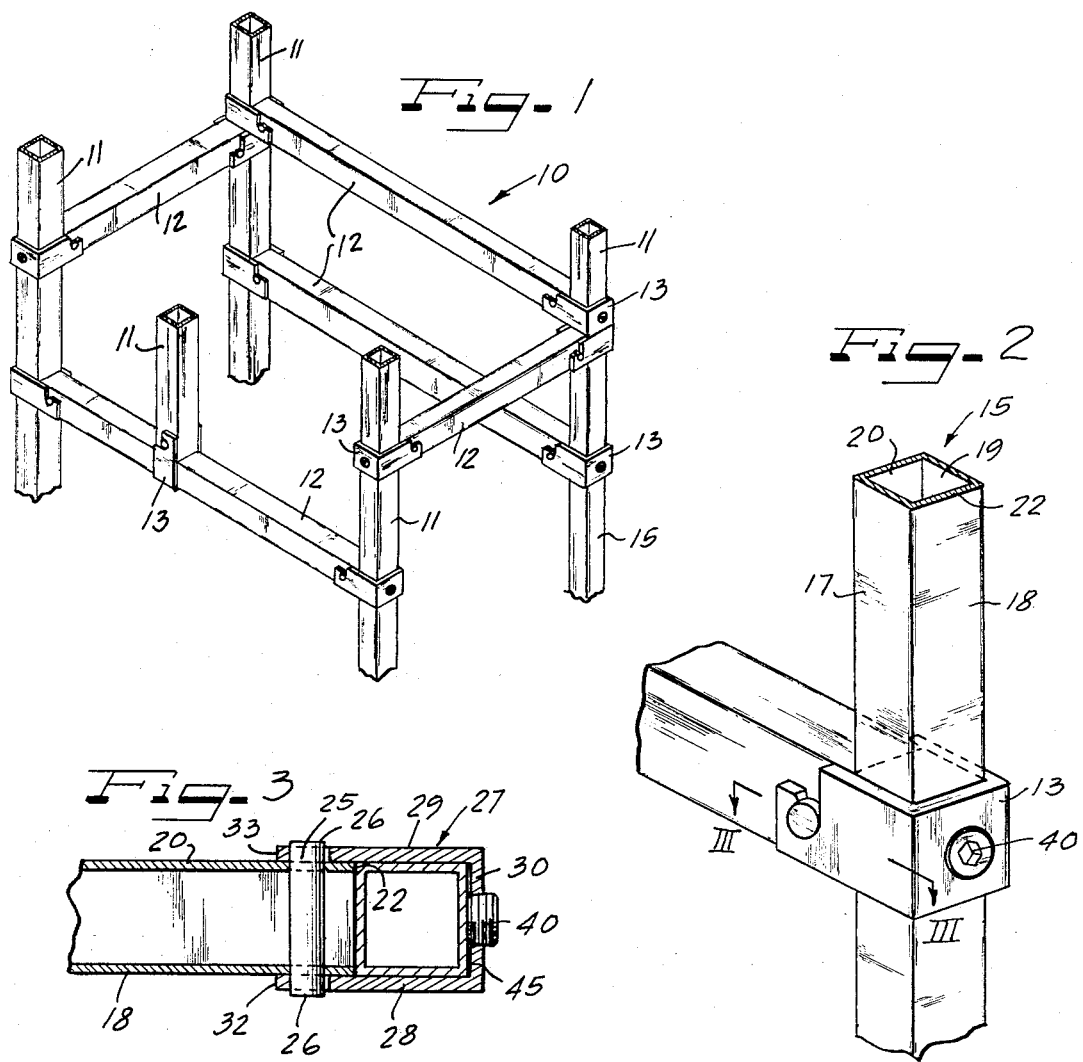
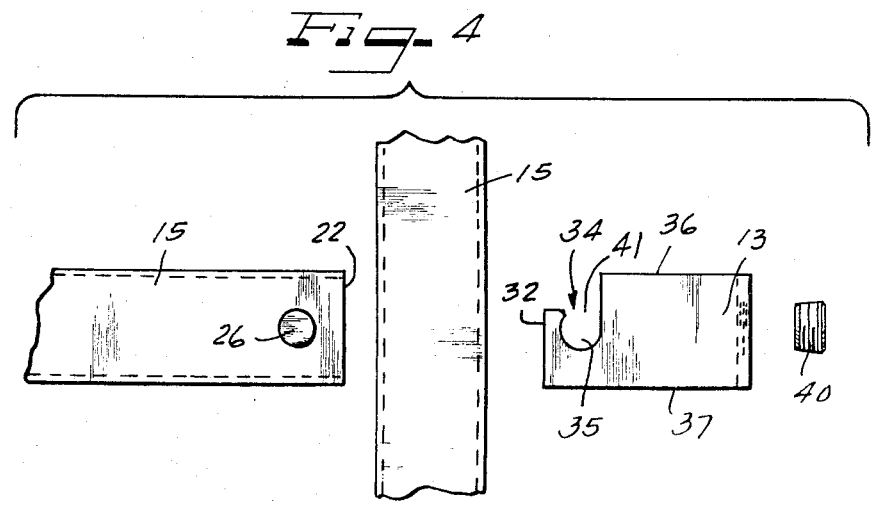

BRACKET SUPPORT STRUCTURE

BACKGROUND OF THE INVENTION

1. Field of the Invention

This invention relates to frame structures and more particularly to a connection for attaching together frame members.

2. Description of the Prior Art

Frame structures such as are used for supports, stands, display apparatus, and other constructions oftentimes consist of a plurality of frame members which are attached together perpendicularly of one another whereby certain frame members constitute vertical frame portions and other frame members constitute horizontal frame portions.

Numerous prior art devices exist for attaching the frame members to one another. Where permanent structures are envisioned, techniques of permanent fastening such as welding, gluing, nailing and the like have been employed. Where less permanent structures are envisioned techniques such as bolting, interfitting projections and slots, bendable metal tabs and the like have been used.

Most such prior art devices are limited in that the number of points of attachment are restricted. This is particularly disadvantageous where a non-permanent structure is envisioned. It would be advantageous to provide a system of attaching together the frame structure members at any desired point so that a kit could be provided consisting of various lengths of members together with attachment devices which would allow the construction of a wide variety of frame structures. To the extent that the prior art has attempted to provide such devices, these devices have generally not been both uncomplex and capable of providing a secure structure.

SUMMARY OF THE INVENTION

My invention provides an attachment device which allows a frame member to have its end attached in perpendicular relation to a second frame member at any point along the length of the second frame member. Further the device provides a secure connection without damage to either of the frame members whereby the frame can be disassembled and reassembled in a different configuration.

The device is designed to be used with rectangular shaped frame members and consists of projections extending from opposite sides of the first frame member adjacent an end thereof and a U-shaped bracket receivable around the second frame member. The U-shaped bracket has openings adjacent the free ends of the legs of the U, the openings being indexible with the projections on the first member. A set screw through the bight of the U-shaped brackets provides for a locking of the connection. Structural stability is achieved through this locking and through the use of rectangular frame members.

It is therefore an object of this invention to provide an improved frame structure.

It is a further and more specific object of this invention to provide a disassembleable frame structure having linear members interconnected at perpendicular angles by means of removable brackets.

It is another and more important object of this invention to provide a disassembleable frame structure having elongated rectangular cross-section members interconnected perpendicularly by means of U-shaped cross-section bracket members received around one of the rectangular members and indexed with projections extending out from the sides of another rectangular member.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

FIG. 1 is a perspective view of a frame structure constructed according to the teachings of this invention;

FIG. 2 is an enlarged fragmentary view of the connecting device of this invention;

FIG. 3 is a view taken along the lines III—III of FIG. 2; and

FIG. 4 is a disassembled view of the connection of FIG. 2.

DESCRIPTION OF THE PREFERRED EMBODIMENTS

FIG. 1 illustrates a frame structure 10 constructed of vertical 11 and horizontal 12 frame members. The members are attached to one another by bracket attachment devices 13 to form a rigid three dimensional structure. Each of the horizontal and vertical members consists of an elongated rectangular cross-section hollow bar 15. As best illustrated in FIG. 2 the hollow bar 15, in the preferred embodiment, is square having four sidewalls 17, 18, 19 and 20. The bar 15 terminates at a rectangular end 22 which is formed by the end faces of the four sides which lie in a plane at right angles to the sidewalls 17–20.

The horizontal vertical members are joined with the end 22 of one member abutted against one of the planar sidewalls 17–20 of the other member. By forming the end 22 on a plane at right angles to the sidewalls the abutment is in a planar surface to a planar surface.

In order to hold the two members in abutment, the bracket 13 indexes with a pin 25. The pin projects through opposed sidewalls 18–20 of one of the members adjacent the end 22 of that member. The member is abutted with another member such that the ends 26 of the pin project in a plane parallel to the plane of abutment and extend beyond the sidewalls of both of the abutting members.

The bracket 13 consist of a U-shaped member 27 having legs 28 and 29 interconnected by a bight portion 30. The bight portion 30 has an interior dimension substantially equal to the width dimension of the walls 17–20 while the legs 28–29 are of greater length than the width dimension of the walls 17–20. In this manner, the bracket can be received around three sides of one of the abutting members with the legs extending along two sides of the other abutting member.

Adjacent the ends 32–33 of the bracket legs 28–29 a portion 34 of the bracket 13 is cut away. The cut away portions form a partial circular opening 35 intermediate the top 36 and bottom 37 of the legs of the bracket. The partial circular opening 35 communicates with a cut away top corner portion so that the opening 35 has a throat opening 41 less than the full diameter of the opening 35. The throat opening is from the top 36 as best illustrated in FIG. 4. The bracket 13 is received around one of the members intermediate its ends and the ends of the pin 25 are received in the partial circular opening 35.

A set screw 40 extends through the bight 30 of the bracket. The dimensioning of the bracket is such that with the set screw removed, the distance from the inside wall 45 of the bight 30 to the center of the partial circular openings 35 is equal to, or greater than, the distance from the walls 17–20 opposite the point of abutment to the center of the pin 25 of the abutted member. Thus the abutted member carrying the pin can be slipped into the partial circular opening 35 through the throat 41. Thereafter tightening the set screw 40 will push the bight section 30 away from the wall of the first member to be joined together. This will cause the legs 27–28 to move with respect to the pin so that the pin contacts the forward wall portion of the partial circular openings 35. Thereafter continuing to tighten the set screw will draw the end surface of the member having the pin against a side wall surface of the other member in tight relation. Once this occurs, the pin is prevented from falling out of the bracket openings due to the fact that the throat opening is less than the full diameter of the partial circular opening. The pin will be positioned at the point of greatest diameter and cannot move vertically downwardly because it would contact the bottom portion of the opening. The pin cannot move vertically upwardly because the forward wall of the opening curves at this point to the narrow throat. Thus vertical movement of the one member with respect to the bracket is prevented. Vertical movement of the other member with respect to the bracket is prevented because of the enclamping action of that member between the tight set screw and the abutting end surface of the member having the pin received in the bracket. Further rotation between the one member and the bracket is prevented because the bracket surrounds three sides of the rectangular member. Rotation between the bracket and the other member is prevented because the bracket lies along two sides of the other member and is itself prevented from rotation because of its receipt around three sides of the first member. Thus the use of the rectangular cross-section frame members prevents rotation. Further the members cannot tilt with respect to one another because the bracket holds them in planar surface to planar surface abutment.

It can thus be seen that the bracket 13 provides a secure joining of the two elongated rectangular cross-section members. Further the members can be joined together at any point along the length of one of the members. That is to say that although a first member having the pin must always be joined to a second member at the end of the first member, it can be joined at any point along the length of the second member.

Further by making the set screw of sufficiently large diameter and constructing the vertical and horizontal members 11 and 12 of sufficiently thick gage material, the set screw will not indent the frame members. Thus the assembled together members can be disassembled by loosening of the set screw and removing the bracket without permanently damaging the members. This provides a completely disassembleable and reassembleable frame structure which can be reused in any desired combination of members.

It will therefore be appreciated that my above described invention provides a frame assembly consisting solely of elongated rectangular cross-section members at least some of which have pins therethrough adjacent their ends and U-shaped cross-section bracket members having openings adjacent the free ends of the legs of the U and set screws projecting through the bight of the U.

Although the teachings of our invention have herein been discussed with reference to specific theories and embodiments, it is to be understood that these are by way of illustration only and that others may wish to utilize my invention in different designs or applications.

I claim as my invention:

1. A frame structure comprising at least two first frame members and two second frame members, each frame member being elongated and being rectangular in cross section, the two first frame members having opposite ends thereof attached to two second frame members with an end face of each of the first frame members abutting a side surface of one of the second frame members and an opposite end face of each of the first frame members abutting a side surface of the other of said second frame members, projections extending through the first frame member adjacent each end thereof, the projections projecting from opposite side faces of the first frame members, the first frame members attached to the second frame members by brackets, said brackets being U-shaped and having two legs interconnected by a flat bight section, the legs terminating in free ends, first openings through the legs adjacent the free ends, the openings having throat openings thereto from an edge of the legs, the throat openings being narrower than the maximum dimensions of the first openings in a line from the free ends to the bight and being positioned closer to the bight than portions of the first openings, a set screw through the bight, said brackets dimensioned to be received around the second members with the free ends projecting beyond the side face of the second members abutted by the ends of the first members remote from the bight by an amount sufficiently large so that the projections of the first member abutting the associated second member can be received in the throat openings by moving the bracket relative to the first member when the bracket is in position around the second member and the free end of the first member abuts the side face of the second member, the first openings dimensioned to loosely receive the projections, the maximum dimension of said brackets, from an inside face of the bight to the most remote wall of the first opening being greater than the dimension from the most remote surface of the projections of an abutting first member and the wall of the abutted second member opposite the surface of the bight when the first member abuts the second member whereby the bracket and an associated first member are movable along the second member after insertion of the projections into the first opening through the throat opening and fastenable at any position therealong by the set screw.

2. The structure of claim 1 wherein the projections constitute a cylindrical member extending through at least the horizontal members and projecting beyond side walls thereof, the cylindrical member having a diameter less than the dimension of the throat openings of the brackets.

* * * * *